July 31, 1945.  G. S. NEES ET AL  2,380,458

METHOD OF DESALTING MINERAL OIL

Filed Jan. 6, 1940

INVENTORS
GORDON S. NEES
RODERICK B. PERKINS JR.
BY HARRIS, KIECH, FOSTER & HARRIS

*Clarence F. Kiech*
FOR THE FIRM

ATTORNEYS.

Patented July 31, 1945

2,380,458

UNITED STATES PATENT OFFICE 2,380,458

METHOD OF DESALTING MINERAL OIL

Gordon S. Nees, Forth Worth, and Roderick B. Perkins, Jr., Houston, Tex., assignors to Petrolite Corporation, Ltd., Wilmington, Del., a corporation of Delaware Application January 6, 1940, Serial No. 312,745

13 Claims. (Cl. 204—190)

In general, the present invention relates to a process for removing foreign matter or other undesirable impurities from an oil and, more particularly, to such a process in which an aqueous material is suitably mixed with the oil, the resulting mixture or emulsion being subjected to the action of an electric field.

The process is applicable to the treatment of oils of sufficient resistivity to permit the building up of high-potential electric fields therein. The word "oil" is herein used in a broad sense and includes, but is not limited to, petroleum oils, topped oils, fractions obtained by distillation, and various other oils which contain foreign matter or impurities. The term, as herein used, is not limited to a water-free oil but also includes those oils which contain not more than a few per cent of water dispersed therein.

The invention is well adapted to the treatment of such oils to remove foreign materials therefrom prior to subsequent treatment. For instance, it is particularly applicable to the removal of various impurities from an oil preparatory to fractional distillation and will be described with reference to a process for desalting crude oil of the type usually received by refineries, this oil being subsequently distilled and/or cracked to produce various overhead and residual fractions.

Various impurities can be removed by the process, whether oil-soluble, water-soluble, oil-dispersed or water-dispersed. For example, if the oil contains even a fraction of one percent of water, this water being dispersed in relatively small droplets, it will usually be found that these droplets contain water-dissolved impurities, usually salts such as calcium chloride, magnesium chloride, sodium chloride, etc. If such an oil is subjected to fractional distillation, these salts may be of a character to react under high temperatures to form corrosive products, particularly acids, thus resulting in serious corrosion difficulties in the stills and other portions of the equipment. In addition, subjection to high temperatures will usually cause deposition on the walls of the subsequent equipment. For instance, if such oils are heated during flow through tubes, it will be found that the deposited material will tend to clog these tubes, prevent the desirable heat transfer therethrough and cause burn-outs. Further, the presence of such salts in the oil to be distilled or cracked may contaminate the resulting products. The present process is very effective in removing such water-dissolved impurities from an oil and will also remove impurities dispersed in the water droplets present in the oil to be treated.

On the other hand, the process is capable of removing impurities dissolved or dispersed in the oil itself. For example, oil-dissolved acids may be present, either naturally or due to acid treatment of the producing wells. The process is very effective in removing oil-dissolved mineral acids not naturally present in the oil and will also remove, to some extent, acids and similar impurities which are naturally present. In addition, it is capable of removing impurities dispersed in the oil, for example, mud, silt, and the like. If the oil contains a small percentage of water, it is sometimes found that such dissolved or dispersed impurities may be simultaneously present in both the oil and water.

It is an object of the present invention to provide an improved process for separating any or all of such impurities from an oil and which involves the addition of an aqueous material which is suitably mixed into the oil, the mixture then being subjected to the action of an electric field of sufficient intensity to coalesce the dispersed aqueous droplets. The coalesced masses are separated and it is found that they will now contain most of the impurities while the separated oil is in much better condition for subsequent distillation and/or cracking. In many instances, the present process is capable of removing considerably more than 90% of the impurities.

As indicated, the impurities which this process ultimately removes from the oil are contained in the aqueous solution which is finally separated from the purified oil. These impurities may, therefore, be generally designated as water-dispersible impurities, having regard for the fact that such impurities may be molecularly or ionically dispersed in the aqueous solution, as in the case of water-soluble salts, or dispersed therein as discrete particles as in the case of finely-divided solids which are wet by the aqueous solution in preference to being wet by the oil, e. g., mud, silt, crystals of water-insoluble salts, etc. As indicated above, the process has one of its most important applications in the removal of saline impurities from salty oils whether in dissolved or dispersed state therein. Such water-dispersible saline impurities are normally dispersed throughout the impure oil, and are frequently present in association with water in the form of dispersed droplets of aqueous brine.

It is an object of the present invention to provide an improved process for the removal from an oil of water-dispersible impurities, particularly saline impurities.

While the present invention may utilize an electric treater similar in many respects to those often used in the art of electrical dehydration of crude oil emulsions, the present invention is not to be confused with any process in which the primary intent is to reduce the water content. Crude oil emulsions, as produced, often contain 50% or more of water, usually in the form of brine. Such emulsions are treated by electrical, chemical, centrifugal, or other means in an endeavor to reduce the water content thereof to pipe-line requirements. As the water content is reduced, a proportional quantity of water-dissolved salts is also removed. However, no such process which does not involve vaporization of the water is capable of completely removing all traces of this water and, even if all of the water is removed by vaporization, the non-volatile foreign matter will still remain in the oil. In many instances, the pipe-line oil resulting from dehydration will still contain several hundred grams of salt per barrel, even though the water content is reduced to as low as a fraction of one per cent. The present process can well start where such dehydration processes leave off and can receive an oil containing not more than a few per cent of water, this oil being one which naturally contains this low percentage of water, or a dehydrated oil produced by any known dehydration process, or an oil resulting from the mixing or blending of oils of different water content. In other instances, the water may be the result of previously-performed steps, whether or not they are of a dehydration character.

The present invention is based in part upon our discovery that various advantages accrue from a chemical modification of the water which is added to and mixed with the incoming oil to produce the artificial mixture or emulsion, and that, when the artificially prepared emulsion or mixture is subjected to the action of an electric field and the coalesced water is separated, the pH value of this water bleed from the treater is definitely related to the effectiveness of the process. It has been found that, by using a chemically modified water, unexpected actions take place and the action in the electric field is modified. The electric treatability of many oils is improved materially, with a decrease in sludging tendency and the production of clean water bleeds. In addition, by suitable chemical modification of the added water, it has now been found possible to remove impurities from many oils which could not otherwise be treated by the electric process to remove impurities therefrom.

The modifying agent utilized may be an acid, a base, or a salt, in solid, liquid, or gaseous form. The particular agent used is selected with reference to its ability to improve the process in general, and usually with reference to its ability to modify the hydroxyl or hydrogen ion concentration of the water bleed of the electric treater.

It is an object of the present invention to electrically remove impurities from an oil by dispersing therein a chemically modified water and then subjecting it to the action of an electric field.

It is an object of the present invention to form and electrically treat a mixture or emulsion in which the oil is the continuous phase and a chemically modified water is dispersed therein, this water being chemically modified in such manner that, when the resulting mixture or emulsion is resolved by the electric process, the pH value of the water issuing from the system will lie between about 7 and 12.

It is a further object of the invention to chemically modify the added water in such a process before formation of the artificial emulsion.

The invention herein-disclosed and claimed forms a valuable adjunct to the process for electrically removing impurities which is disclosed and claimed in the copending application of Harold C. Eddy, Serial No. 122,470, filed January 26, 1937, now Patent No. 2,182,145. In that application, there is disclosed a process in which a relatively fresh water is added to and mixed with an oil containing not more than a few per cent of water, if any, to remove impurities similar to those removed by the present process. In that application, the added water is not particularly selected with reference to the pH of the water bleed, and the mixing action is of such character as to form an emulsion of such character as to be continuously resolvable with the aid of an electric field into water and oil containing only a small percentage of water. In this emulsion, the added relatively fresh water droplets coexist in large measure with the original water droplets or impurities and are of an average size larger than the originally-present droplets or impurities. The mixing action is so controlled that this type of emulsion is formed to the avoidance of predominantly associating the relatively fresh and the original water or impurities during this mixing. The emulsion is moved into an electric field where the water is coalesced and where the impurities are brought into association with the added water. By way of illustration, the present process will be described with reference to that disclosed in the patent supra, though it should be clear that this invention is not necessarily limited to the conditions therein set forth. The present invention can relate to the process set forth in the Eddy patent and can be made to improve treating conditions, decrease or eliminate sludging tendencies, and produce clear water bleeds where difficulties are encountered in any of these respects. In addition, the present invention makes the Eddy process applicable to certain oils not heretofore considered capable of electric treatment to remove impurities. In view of the wide application of this process to the removal of saline impurities from oil, it may be suitably termed a desalting process without, however, thereby limiting it to such an application.

In some instances at least, the desideratum that the synthetic emulsion or dispersion produced in the desalting operation be continuously resolvable with the aid of an electric field without progressive accumulation of sludge constitutes a limitation on the degree of purification which can be obtained by the process. Certain oils, whether by virtue of the presence of natural emulsifying agents such as naphthenic acids, asphaltic acids, or other specific agent, yield emulsions which are difficult to treat electrically. Within certain ranges, the recalcitrance of such emulsions or dispersions toward treatment by an electric field increases with the degree or intimacy of mixing employed. On the other hand, for the highest percentages of impurity extraction, it is desirable that at least some of the added water be present in the synthetic emulsion or dispersion as rather small droplets dispersed throughout the oil, as indicated above, and if the synthetic dispersion is unduly coarsened in the attempt to avoid treating difficulties, purification may suffer. It is one of the principal objects of this invention to provide an independent means of control of the electric treatability of the synthetic desalting emulsion whereby it may be rendered continuously and rapidly resolvable with the aid of an electric field while the degree of purification obtained by the process as a whole is unimpaired or even improved.

It is also a general object of the invention to provide a purification process for removal of water-dispersible impurities from oil in which a synthetic emulsion comprising added water droplets is electrically treated, and in which the electric treatability of the emulsion as a whole is controlled to permit the continuous and rapid resolution thereof by electric treatment without progressive accumulation of sludge in objectionable amount, while simultaneously maintaining the electric coalescibility of the added water droplets in proper relationship to the electric coalescibility of the coexisting disperse particles comprising the impurities such that mixed coalescence between the added water and impurities will be obtained. Further objects are to provide a method and suitable agents for such control, usually alkaline agents, and to provide readily ascertainable criteria for the quantity thereof to be employed, particularly as expressed in terms of pH of the effluent water.

Further objects and advantages of the invention will be made evident hereinafter.

Referring to the drawing, Figure 1 is a diagrammatic view partially in section indicating one type of apparatus which is well adapted to the present invention.

Figure 1:
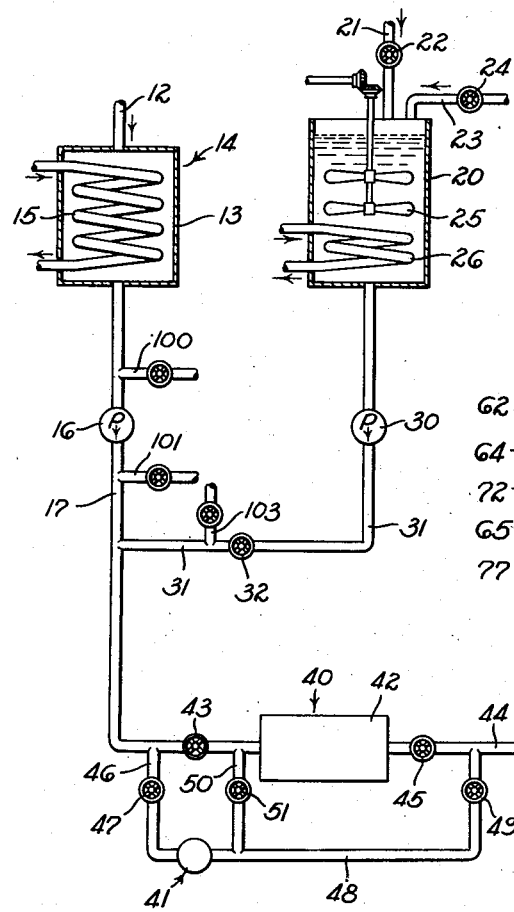

Referring particularly to Figure 1, the incoming oil to be treated moves through a pipe 12. It can be heated during flow through a tank 13 forming a part of a heater 14, a suitable heating medium being circulated through a coil 15. Various types of heaters can be used in this capacity. As disclosed, the oil is moved from this heater by a pump 16 which discharges into a pipe 17.

The available water is moved into a tank 20 through a pipe 21 as controlled by a valve 22. The chemical modifying agent may be introduced continuously or intermittently into the tank 20 through pipe 23 provided with a valve 24 or any other suitable means can be utilized for mixing the available water and the modifying agent in proper proportions before introduction into the oil. If batch or continuous mixing is to be effected in the tank 20, a suitable agitator 25 may be provided. The resulting modified water can be heated, if desired, by a coil 26 or by other means.

Various means not per se a part of this invention can be used to determine or control the chemical composition of the resulting solution. In other instances, the composition or concentration of this added water can be controlled merely by reference to the relative amounts of water and modifying agent utilized. Preferably, the character of this modified water is such that, with the particular oil being treated, the pH of the electrically separated water is maintained at a value between about 7 to 12. A pump 30 may be used to force a stream of the modified water through a pipe 31, as controlled by any suitable means, such as a valve 32. This pump develops sufficient pressure to force a proportioned quantity of the modified water into the flowing stream of oil in the pipe 17. This introduction will in itself result in the formation of a preliminary mixture which continues its flow along the pipe 17.

A suitable mixing or emulsifying means 40 serves to mix the materials additionally to form what is hereinafter termed an "artificial emulsion." This means should be of such character that it forms an artificial emulsion susceptible to electric treatment and preferably capable of continuous resolution with the aid of an electric field to form bodies of oil and water, as distinct from oil and sludge. Various means can be used in this regard, such as a mixer 41 of suitable type or an emulsifier 42 which may be in the form of a valve, such devices being so designed and operated as to form an electrically-treatable artificial emulsion. In any instance, the emulsifying means is so adjusted as not to homogenize the preliminary mixture or too intimately mix the oil and the modified water.

If the present invention is used in conjunction with that disclosed in the Eddy patent supra, the emulsifying means will desirably be of such character that it will not cause, during the mixing, any predominantly large combination of the original water droplets with the modified water. In other words, it will be of such type as to form an artificial emulsion in which a major portion of the original water droplets coexist with droplets of the modified water. As mentioned in that patent, it is desirable in some instances to use such emulsifying means separately, though, in other instances, it is desirable to flow the preliminary mixture therethrough in succession to obtain a dual emulsifying action. Assuming that only the emulsifier 42 is to be used, the preliminary mixture will flow through a valve 43 in the pipe 17 and will be delivered from the emulsifier 42 through a pipe 44 provided with a valve 45. This is the usual mode of operation. If the mixer 41 is to be used exclusively in this capacity, the valve 43 will be closed and the preliminary mixture will flow from the pipe 17 through a pipe 46 and a valve 47 into the pipe 44 through a pipe 48 and a valve 49. If both devices are to be used, the valve 43 will be closed and the preliminary mixture will flow from the pipe 17 through the valve 47 and the mixer 41 and will return to the pipe 17 at a position beyond the now-closed valve 43 through a pipe 50 including a valve 51. It will then flow through the emulsifier 42 and be discharged into the pipe 44.

In any event, the artificial emulsion will move through the pipe 44 and into an elecetric treater 60 where it is subjected to the action of an electric field wherein the dispersed droplets are coalesced and wherein an action takes place causing incorporation into the water of various impurities. Various types of electric treaters can be utilized, the illustrated embodiment being shown only by way of example. In the type of treater shown, electric treatment and separation take place in the same tank 61. It will be understood, however, that separation can take place in a separate tank, if desired.

The electrode structure shown includes an upper live electrode 62 supported by insulators 63 and providing downward-extending annular rings 64 which are concentrically arranged and secured to depending pins. Below the live electrode 62 is positioned an intermediate live electrode structure 65 including electrodes 66 and 67 spaced from each other yet electrically connected by a rod 68 which hangs from an insulator 69. The electrode 66 is provided with upward-extending annular rings 70, preferably directly below the spaces between the annular rings 64 of the electrode 62 so that any potential difference therebetween will set up an electric field in an upper treating space 72, the most intense portions of this field being inclined and extending from the edges of the rings of one electrode to the adjacent edges of the rings of the other electrode.

The electrode 67 is similarly formed with downward-extending annular rings 73 which cooperate with upward-extending annular rings 74 of a lower electrode structure 75 in defining a lower treating space 76. Rods 77 extend downward from the upper live electrode 62 to support and energize the lower electrode structure 75.

The artificial emulsion is introduced into the tank 61 by any suitable means and better action is usually obtained, particularly on oils having a sludging tendency, by direct introduction thereof into the lower treating space 76 through a suitable distributor 78 which flows the artificial emulsion outward in this field and across the most intense portions thereof.

The incoming emulsion does not constitute the sole material which is thus transported through the field. By processes of aspiration due to the jetting action of the incoming emulsion into the field and the open-throat character of the electrodes, recycling of some of the treated constituents through the field takes place. For example, circulation paths, both above the electrode 67 and below the electrode structure 75, are set up, the constituents moving toward the center of the tank and thence into the treating space 76. During such movement, some of the water will settle from the treated constituents. This recycling provides for the return of a substantial portion of previously electrically treated material to the treating field. The recycled material coming from below the treating space comprises droplets or masses of water or dilute brine which are relatively rich in counter-emulsifying agents derived from the action of the alkali on the petroleum acids, or the droplets or masses may be otherwise modified by the alkali to be particularly susceptible to coalescence by electric action. This provides both an increased concentration of readily coalescible particles and an increased concentration of counter-emulsifying agents in the zone of electric coalescence, whereby the treatment of the incoming emulsion is substantially aided. Another portion of the recycle fluid comes from above the treating space and comprises relatively dry oil, and this is of assistance in maintaining the desired voltage gradient in the field, as well as in facilitating treatment. Such recycling also subjects to repeated electric treatment any unresolved emulsion or sludge which may tend to remain after once-through-the-field treatment.

The water masses which have been sufficiently coalesced move downward in the tank 61 to form a body of water with its upper surface indicated by the numeral 79. During this movement, the water and some of the recycled material is subjected to an auxiliary electric field which exists between the lower electrode structure 75 and the surface 79 of the body of water. Water may be continuously withdrawn from this body by a pipe 80, the flow being controlled by any suitable means, such as a valve 81. The oil moves upward in the tank 61 and is subjected to a further action in the treating space 72, being finally withdrawn through a pipe 82 suitably controlled as by a valve 83. If this oil is to be refined, distilled, or cracked to remove various fractions therefrom, it may be pumped from the pipe 82 into the usual refinery equipment either with or without an additional settling period.

In energizing the electrodes, it has been found desirable to utilize a high voltage alternating potential. However, treatment by use of various peaked wave forms or intermittently supplied potentials, or other potential supply means will be found effective and can be used without departing from the spirit of this invention. In the illustrated embodiment, we have shown a double-transformer system in this capacity including two transformers 90 and 91. One terminal of each secondary winding is grounded as indicated by the numeral 92. The remaining high-tension terminal of the transformer 90 is connected to the intermediate electrode structure 65 by a conductor means 93 extending through a bushing 94. The remaining high-tension terminal of the transformer 91 is connected to the upper electrode 62 by a conductor means 95 extending through a bushing 96, the same potential being impressed on the lower electrode structure 75 through the interconnecting rods 77. Assuming, for instance, that each transformer develops a potential of 12,000 volts and assuming that the transformers are additively connected, the potential across the upper treating space 72, as well as the lower treating space 76, will be 24,000 volts. However, the potential between any grounded portion of the treater and the electrode 67 or the electrode structure 75 will be only 12,000 volts, thus tending to prevent short-circuiting to the tank or to the emulsion distributor 78. This particular electric treater is not per se a part of the present invention but represents one of numerous types capable of establishing electric fields of the character desired.

One of the advantages of such a system is that it permits modification of the water before the artificial emulsion is formed so that the modifying agent can be incorporated into the water before reaching the emulsifying means, whereby the effect of the agent on the interfaces of the added droplets is enhanced.

However, it is not always essential to add the modifying agent directly to the water in the manner shown in Figure 1. In some instances, this modifying agent can be proportioned into the flowing stream of oil to be treated through pipes 100 or 101 to be present when the water from available sources is introduced through pipe 31. If introduced through the pipe 100, the pump 16 will exert a mixing action, though it is usually sufficient to introduce the modifying agent through the pipe 101 and rely upon turbulence in the pipe 17 to give any mild mixing which may be desirable before reaching the point of entry of the water through pipe 31. In other instances, the tank 20 and its associated equipment can be dispensed with and the modifying agent can be continuously introduced in proportioned quantities into a flowing stream of the available water. For example, it may be pumped through a pipe 103 into a stream of the available water flowing through the pipe 31. In either instance, a modified water results and appears in the resulting emulsion when introduced into the electric field.

One of the important features of the present invention is to modify the available water in such manner that the water bleed of the electric treater 60 issuing from the pipe 80 will have a pH value within a range of about 7 to 12. Numerous advantages have been found to result from this correlation.

These advantages are evidenced by the generally improved character of the process and, more particularly, by the improved electric treatability of the synthetic emulsion. This improvement in electric treatability, which is primarily evidenced by the completeness and rapidity with which the emulsion is resolved, may manifest itself in various ways, including mitigation or prevention of sludge formation, reduction of the salt and/or water content of the purified oil, and mitigation or prevention of electrical disturbances such as short-circuit, arcing, or undue current consumption.

The successful treatment of a water-in-oil emulsion in a high-tension electric field doubtless involves many factors which are still unknown or unappreciated, but even the most simplified picture of this phenomenon must take into account two major factors; first, the inter-particle forces which tend to bring the dispersed droplets together in mutual contact, and, second, the preparation or modification of the interfaces surrounding the droplets so that coalescence will take place on contact.

The first factor, pertaining to inter-particle forces, has its origin in the electrical characteristics of the oil and of the dispere phase. Probably the most important electrical characteristic here-concerned is the dielectric constant, which is very large for water (80 to 82) and quite low for petroleum oils (2 to 4). As a result of this much greater polarizability of the water, the dispersed droplets receive an induced dipole charge in the electric field so that separate droplets are brought together by the attraction between their induced dipoles. If a non-uniform field is imposed, there is also a tendency for the droplets to concentrate in the stronger portions of the field.

The second factor, pertaining to the stability of the interface, arises from the fact, well known in colloid chemistry, that an encounter or contact between two dispersed droplets does not result in their mutual coalescence when the emulsion is fully stabilized, and that the probability of coalescence on contact is substantially less than unity even when the emulsion is only partially stabilized. A protective film made up of stabilizing agents adsorbed at the interface surrounds the droplets and prevents that intimacy of contact between the interior phases of contacting droplets which is essential for coalescence. In many instances, the electrical forces present in the field are effective in dislodging, nullifying, or otherwise affecting the adsorbed stabilizing agent so that the interface is destabilized and the probabiilty of coalescence on contact is increased.

This destabilization may also be aided in many instances by certain chemical agents and the presence of chemical agents adapted to destabilize the films and/or to prevent their formation may be regarded as a third factor. Such counter-emulsifying agents may be formed in situ by reactions of the modifying agent added in accordance with this invention.

With this picture in mind, the problem of sludging may be briefly reviewed. Sludge, as encountered in the electric purification operations herein contemplated, consists largely of two types, here-termed "fine sludge" and "coarse sludge." The fine sludge comprises water particles which, in large part, have escaped substantial coalescence during the action of the electric field. These particles gradually settle in the settling zone to accumulate near the interface between the bodies of separated oil and water as a compact fine-grained emulsion. The aqueous droplets of this sludge emulsion are, for the most part, small and represent droplets originally present in the untreated dispersion and droplets which have been somewhat increased in size by coalescence during electric treatment but not to the extent desired. The degree of compaction may vary up to an emulsion containing a very large amount of water.

Sludges of this fine-grained type are indicative of poor electric treatability, and their control and prevention according to the present invention reside in improving the treatability of the dispersion or emulsion subjected to the action of the electric field.

The second type of sludge, namely coarse-grained or flocculent sludge, is constituted largely by water particles of substantial size, typically $\tfrac{1}{16}$ inch in diameter or larger. The amount of oil or external phase associated therewith may be quite small and limited to oily membranes which form sacs or "honeycombs" which enclose the large water particles. This type of sludge frequently has a density approaching that of the aqueous phase, and it tends to accumulate at, and obscure, the interface between the separated water and oil or to become dispersed as flocculent aggregates in the water.

The size of the water droplets in the coarse sludge is indicative that substantial coalescence took place during electric treatment, and the principal factor involved in the formation of this coarse sludge seems to be the presence of irreversibly adsorbed material, typically adsorbed materials in solid form, in the protective membranes. These membranes may be ruptured by the force of the electric field, e. g., by stretching of the droplets, to permit coalescence, but the membranes are not reversibly adsorbable and are carried down in settling to mechanically enmesh the water droplets. The control of this type of sludge in the present invention is accomplished not so much by increasing the effectiveness of the electric field as it is by modifying the character and decreasing the stability of the interfacial film, thereby aiding the processes of desorption.

Sludges somewhat resembling the above types may in some instances be formed in the process by the use of excessive amounts of alkaline materials. The use of excessive amounts of strong alkalies may result in extensive saponification of the petroleum acids to form alkali soaps which, when formed in excessive amount in the presence of alkaline earth salts, may be converted, in part at least, into alkaline earth soaps soluble in the oil phase and detrimental to the process, in contradistinction to the beneficial counter-emulsifying effects derivable from the presence of a small amount of the alkali soaps. Sludges formed under these circumstances contain, and are stabilized by, such soaps and the appropriate remedy for such "saponification sludge" lies in the limitation of the quantity and strength of the alkali employed and/or suitable control of the pH. The saponification sludge usually resembles the fine-grained sludge described above, but in some instances the excessive use of alkali may also result in inverse phase water bleeds containing droplets of oil stabilized by excess soaps remaining dispersed in the water.

Sludging and allied problems of electric treatability as encountered in the present process are distinctive in character and differ substantially from the problem of electrically dehydrating emulsions which contain particles all of one kind, typically particles of natural brine. For example, in desalting according to the present process, two types of particles are delivered to the electric field, one type being constituted by a relatively strong brine and the other type by a relatively fresh water. It is a necessary part of the process that coalescence take place under the action of the field between these two types of droplets, and that this "mixed" coalescence not only obtain initially, but also continue as between dilute brine droplets formed as a result of the initial coalescence and additional water droplets. As a result, there is a progressive change in the constitution of the disperse phase during coalescence, and, in particular, the brine droplets coalesce with the relatively fresh water droplets to produce progressively more dilute droplets of augmented volume. This progressive dilution gives rise to effects which may tend to oppose the continued coalescence to augmented masses of the desired magnitude. For example, hydrolysis of the alkaline earth chlorides tends to make the dilute brine more acidic, which is undesirable from the standpoint of treatability. The density of the dilute brine is relatively low, and the size of the coalesced masses of dilute brine necessary to obtain ready gravitational separation may be greater than with the denser concentrated brine. These and other factors tend to slow down or prematurely stop the progressive coalescence to masses of the requisite size, and, hence, there is a strong tendency in some instances for a portion of the emulsion to escape complete resolution and to appear as sludge. While this can usually be combatted to some extent by less intimately mixing the added water with the oil, this ordinarily results in a reduced degree of purification not desirable under the most exacting conditions.

The establishment and maintenance of "mixed" coalescence by appropriate control of pH or related factors so as to obtain adequate removal of impurities in association with coalesced masses of dilute brine of sufficient size to separate readily and completely from the oil without substantial accumulation of sludge is thus one of the principal objects of the invention.

The discovery that the pH of the aqueous phase, particularly as manifested in the fully coalesced or separated masses of water, is a criterion which can be used in establishing and maintaining the desired mixed coalescence, as well as in improving the electric treatability of the dispersion as a whole, invites speculation as to the possible mechanisms involved. Without intent of limiting the invention to theoretical concepts, the following is offered in the way of partial explanation.

The alkalinity of the added water droplets prevents the acidic hydrolysis of the brine during dilution. There will be a partial neutralization of oil acidity, whereby the electric treating characteristics may be improved and other benefits obtained. Counter-emulsifying agents will usually be formed, typically by the process of neutralization of organic acidity, and desorption of stabilized films may be aided. Neutralization of emulsifying agents is induced by the action of the alkali due to the formation of surface-active agents in the water which act on the stabilizing agents on the oil side of the film, or which transfer to and become associated on the oil side of the film to nullify or neutralize the stabilizing agents. The process optimum pH may vary somewhat with various oils according to their character but, in general, is found to lie within the range of about pH 7 to pH 12 for the effluent water. With difficultly treatable oils, it is usually advisable to add sufficient pH modifier, suitably an alkaline agent, to bring the pH to its optimum value, but with oils which are only moderately difficult to treat, it may suffice to add a smaller quantity of alkali, whereby adequate treating is obtained at lesser cost.

Optimum or adequate pH values can be readily established in continuous plant operations by adding various amounts of alkaline agents and correlating the resulting pH values of the effluent water with the electric treatability of the emulsion, as indicated by various criteria, such as absence of sludge, adequate desalting, low water content of the purified oil, absence of electrical disturbances, and the like. Optimum pH values and also the general relationship between pH and treatability can be established by laboratory experiments preferably conducted in such manner as to leave some sludge even at the optimum pH value so as to give an accurate measure of treatability at all pH values concerned. In plant operation, there will be little or no sludge formed at the optimum pH value, and frequently no accumulation of sludge will be observed within a pH range varying somewhat on either side of the optimum pH. Such a range may be regarded as a range of adequate pH values for the particular water and oil concerned.

Figure 2:
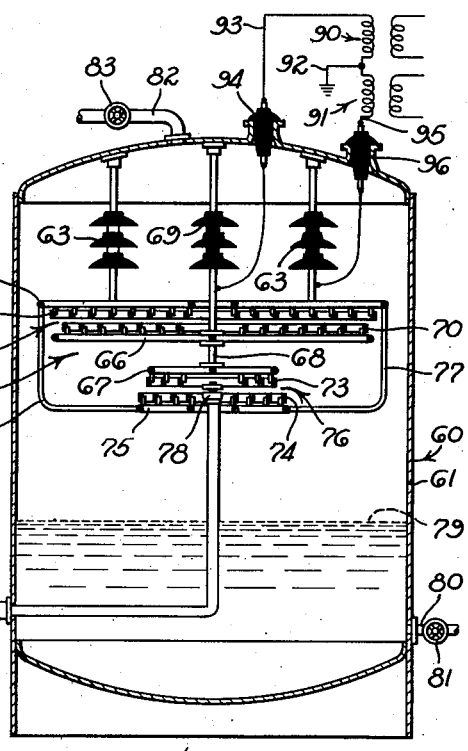
Figure 2 is a graphical representation of the relationship between sludge formation and the pH of the issuing water.
Figure 2:
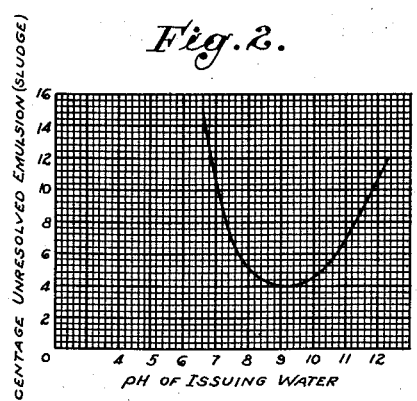

Laboratory tests may be made in either batch or continuous treaters, preferably with the duration or intensity of emulsification and/or electric treatment so adjusted that some sludge remains at all pH values tested. A graphical representation of the results of such a test is shown in Figure 2 which represents data obtained on a given typical oil using laboratory technique. Ordinates represent percentage of unresolved emulsion and this ordinate scale is thus a function of the amount of sludge formed. It is desirable that this sludge be reduced to a minimum. The abscissa scale represents the pH of the issuing water after cooling to room temperature. From the curve shown, it will be clear that the amount of sludge is a minimum on this oil at a pH of about 9.2. Other oils evidence similar characteristics, the lower portion of the curve lying within a pH range of about 7 to 12, though the optimum value may shift within this range depending upon the characteristics of the oil and water being tested. The curve in Figure 2 gives further evidence of the desirability of the invention in producing clean water bleeds, for contamination thereof is dependent in large part upon the amount of sludge formed.

Figure 3:
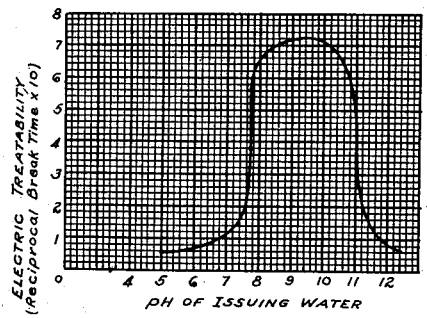
Figure 3 is a graphical representation of the relationship between electrical treatability and the pH of the issuing water.

Figure 3 illustrates another advantage of maintaining the pH of the issuing water within a range of about 7 to 12. In this curve, the pH of the issuing water is plotted on the abscissa scale. The ordinate scale represents electric treatability, as measured by reciprocal break time. This "break time" is directly related to the ability of an electric treater to coalesce and separate the water droplets. The shorter the break time the more effective and efficient is the electric treating process. The reciprocal of this break time is thus a direct function of electric treatability. The curve in Figure 3 is plotted with reference to the same oil tested in arriving at the curve of Figure 2. It is to be noted that, within a pH range of about 7 to 12, treatability is very good, with best conditions at about 9.5. Here again, the curve will vary with different oils but will show an optimum value between about 7 and 12. By comparison of Figures 2 and 3, it will be noted that the desirable range of pH values of the issuing water is about the same, whether considered with reference to sludge formation or treatability, a result which is quite unexpected. Just why this rather definite relationship exists, and just why better treatment can be obtained if the pH of the issuing water is kept within the range of about 7 to 12 is not completely understood. If the mixing action utilized in forming the artificial emulsion is such as to produce coexistence of the original and added water droplets, the latter carrying the modifying agent, it may be that the electric field will somehow coalesce the droplets with greater ease when the added water droplets are of proper alkalinity. However, we are not limited to this concept.

Another important advantage of the invention lies in its ability to remove impurities from oils which could not heretofore be purified by subjection to an electric treating action. By way of example, oils produced from the Wilcox sand in Oklahoma are incapable of being electrically dehydrated commercially. These oils are of a short-circuiting character, even though the water content is low. If attempts are made to electrically remove impurities from this oil by adding thereto fresh water (e. g., tap water or waters drawn from lakes, rivers, etc.), successful commercial desalting cannot usually be obtained. However, by use of the present invention, it has been found possible to modify the added water chemically and make possible the electric purifying treatment herein-contemplated when starting with oils containing not more than a few per cent of water. Chemical modifying agents capable of maintaining the pH of the issuing water within a range of about 8.0 to 8.8 have been found best. Optimum results are obtained with this oil when the pH of the water bleed is about 8.5. Here again, it is not completely understood why this particular oil can be purified by electric treatment if the water bleed is maintained within this limited range of pH. On such an oil, the characteristic curves corresponding to Figures 2 and 3 will be sharper, indicating a narrower range desirable for adequate treating. Between such an extreme oil and the one tested in obtaining the curves of Figures 2 and 3 will be found other oils in which desirable treatment is effected within a narrower pH range of about 8 to 10. Optimum operating conditions on any oil within the ranges given can best be determined by actual tests or by varying the amount of chemical modifying agent somewhat above or below that which will produce an effluent pH of about 9, which is a good starting point and not far removed from excellent operating conditions on many oils.

Use of alkali to modify the effluent pH to within the ranges indicated above will result in substantial neutralization of the stronger acids which may be in the oil, and there may be a slight saponification of weaker soap-forming acids to form desirable counter-emulsifying agents, but the water is not so alkaline as to extract and convert into soaps excessive quantities of the weaker soap-forming acids. In a few instances, however, the oil requiring treatment will depart from normal in either the amount or kind of acids contained therein, with corresponding displacements of the optimum pH.

Adequate treatment may usually be had throughout a much broader range, typically 7 to 12, but it is seldom necessary or advantageous to go beyond the pH of 10 and thereby, in effect, to waste a portion of the chemical employed. Accordingly, the pH range of 7 to 10 represents an adequate working range for most purposes and with most oils.

In a few instances, the unmodified pH of the effluent water will be found to be on the alkaline side of the optimum pH for a given oil. In such cases, the addition of an acid or acidic salt in amount sufficient to modify the pH and bring it closer to or within the optimum pH range has been found to greatly improve treatability and to prevent sludging.

Even on those oils from which impurities can be electrically removed in substantial quantity in accordance with the process disclosed in the Eddy patent supra, it will frequently be found that better treatment in general will be obtained by following the teachings of the present invention.

The action which takes place in the electric field when the artificial emulsion is introduced thereinto is not entirely explainable. Coalescence of the dispersed droplets will, of course, take place and, if droplets of the added water coexist with droplets of the original water containing the impurities, the electric field will bring these together and produce coalesced masses which will be of a composition determined both by the impurities present in the original droplets and the modifying agent present in the added water droplets.

In addition, the electric field appears to have some action other than merely coalescing the dispersed water droplets when considered with respect to impurities dissolved or dispersed in the original water droplets, if present in the incoming oil. These additional actions, which include the "mixed" coalescence described above, apparently account for the high efficiency of the present process. Analyses and tests of the artificial emulsion substantiate these improved results. By way of example, if the resulting artificial emulsion is by-passed from the pipe 44 just before entering the treater, and if the mixing action has been of such character as to maintain the major portion of the original water droplets coexisting with droplets of the added water, a major portion of the water-associated impurities will still be found present in the original droplets. If an attempt is made to cause coalescence by means other than an electric field, it will be found that the percentage of impurities removed will not be nearly as high as if the artificial emulsion were subjected to the action of an electric field and that sludge will not be effectively eliminated. By way of example, if the resulting artificial emulsion is thus by-passed from the pipe 44 and centrifuged to separate the dispersed droplets, it will be found that separation by centrifugal action will not remove the large portion of water-associated impurities and, in some instances, oil-dissolved impurities, which can be removed by subjection to an electric field, and sludge will be present. This is true even though the centrifugal action is continued to produce an oil of the same water content as that issuing from the pipe 82 of the electric treater 60. It is common to find oils in which such comparative tests indicate a removal of more than 90% of the water-associated impurities by use of the electrical process and in which centrifuging of the same artificial emulsion will remove only about 64% of these impurities. Such tests indicate that the electric field has some action in addition to its recognized capability of coalescing dispersed water droplets.

In general, it has been found that best results can be obtained by the process herein set forth if the following factors are kept in mind.

The incoming oil to be treated may be substantially dry or may contain not more than a few per cent of water in the form of dispersed droplets, and this incoming oil should be of such character that a high-intensity electric field can be built up therein after addition of the modified water and under the operating conditions contemplated. Oils containing water in amount from a small fraction of 1% to about 3%, or somewhat above, can be very satisfactorily treated.

The available water moving through the pipe 44 need not be distilled water and can contain various dissolved substances, though the available water should be relatively fresh with respect to the dispersed impurity-containing droplets to be removed, i. e., the available water should contain substantially less of the water-soluble impurities than do the original water droplets dispersed in the incoming oil. The usually available fresh waters commonly used for domestic purposes, or waters drawn from rivers, lakes, or sumps may be used.

The modifying agent is preferably a water-soluble chemical which alters the alkalinity or acidity of the available water, i. e., it is of a character capable of changing the pH value of the water used. Acids, bases, or salts may be used in this connection and are selected with reference to the oil being treated, the character of the available water, and the desired pH of the issuing water. Most commonly, the modifying agent is alkaline in character, particularly as the oil to be treated is often acid and particularly as the water bleed is desirably between about pH 7 and 12, as distinct from a water bleed which would be more acidic if the available relatively fresh water was employed in the absence of the alkaline modifying agent. In general, we may use the alkali or alkaline-earth oxides and hydroxides and some of the metal oxides and hydroxides, or a salt of a strong base and a weak acid. Sodium hydroxide, potassium hydroxide, ammonium hydroxide or ammonia are very desirable. Other modifying agents which can be used are materials such as disodium phosphate, sodium carbonate, sodium phenolate, sodium borate, etc., or alkaline-earth di-hydroxides such as calcium hydroxide or other materials which will give the desired change in pH of the issuing water.

The salts of strong bases and weak acids, typically disodium phosphate, sodium carbonate, sodium phenolate, borax, and the like, form an especially desirable class of alkaline agents in view of their buffering action, that is, their ability to maintain the pH value of the aqueous phase substantially constant in spite of reactions, such as the neutralization of oil acidity, which tend to consume the alkaline agent and reduce its concentration. By the use of such buffers, the pH value of the aqueous phase can be maintained substantially constant at its optimum or other desired value throughout the entire desalting process. This is in substantial distinction to the changing conditions which arise when strong unbuffered alkalies are used which give an initially relatively high pH value to the aqueous phase which continues to decrease during the successive stages of the process due to the attenuation of the alkali. Even though the pH of the effluent water is fairly indicative of the equilibria obtaining in the final stages just prior to separation, it is clear that, in the absence of buffers, this pH does not necessarily obtain throughout the earlier stages of the process. By using alkaline buffers, substantially the same pH values may be established for both the influent and effluent water, whereby optimum pH values may be maintained throughout the entire process. Furthermore, and particularly where there is any substantial amount of acidity to neutralize, the amount of alkali which it is necessary to employ may, in the absence of any buffering action, result in excessively high initial pH's which form soaps or hard water precipitates which later fail to equilibrate and which act detrimentally on the process. It is, therefore, in many instances highly advantageous to use alkaline buffers, i. e., salts of a strong base and a weak acid, in order to give more accurate and extensive control of the pH throughout the process, to avoid difficulties which may arise with the initially high pH's of unbuffered alkaline solutions, and, in general, to improve the ease and certainty of obtaining and maintaining the desired pH value.

Alkalies which are oil-soluble, as well as water-soluble, for example, sodium phenolate and ammonia, also constitute a special class of alkaline agents which are particularly well adapted for addition to the oil before the addition of water, as more fully illustrated hereinafter.

In general, it is most advantageous to use as alkaline agents compounds containing alkali metal (including ammonium) cations, such as alkali metal hydroxides and oxides, or salts thereof having an alkaline reaction, or anhydrides such as ammonia.

The modifying agent may be of such nature as to react with chemicals incidentally present in the original water. The reaction products do not appear to interfere with the process, even though some precipitates may result provided they remain dispersed in the water. If such precipitates tend to clog the pump 30, the difficulty can be rectified by continuously introducing the modifying agent in proportioned quantities into the pipe 31 through the pipe 103. If non-neutral impurities are present, such as oil-dissolved acids, some of the modifying agent may be used up in reacting therewith. For example, if a modified water of alkaline character is used, some of the modifying agent will not be available for directly modifying the pH of the issuing water due to a partial or complete neutralization of such oil-dissolved acids as are strong enough to be neutralized at the prevailing pH.

The quantity and character of the alkali which should be added depends to some extent upon the character of the water employed, particularly its pH value, its alkali ·⎯rve, and the presence or absence of buffering agents. In a few instances, water comprising sufficient alkaline agents or buffers may be available without necessity of modification by the addition of a special agent, in which case my invention extends to the selection, for desalting use, of such waters on the basis of their content in alkalies or alkaline salts.

The quantity of the modifying agent utilized will depend upon such reactions and upon the desired pH of the issuing water. The proper quantity can be determined empirically, and pH determinations, either continuous or intermittent, of the water bleed issuing from the pipe 80, will serve as a criterion for increasing, decreasing, or changing the type of modifying agent used, these pH's being determined after cooling the water to room temperature (e. g., about 75° F.), care being taken to avoid errors due to evaporation or vaporization losses. The modified water may be made up in batches or the modifying agent may be continuously proportioned with respect to the available water, either in the tank 20 or by other suitable means.

The quantity of alkaline material necessary to employ in order to obtain the desired optimum pH, as well as the precise range of the optimum or adequate pH itself, depends on various factors, such as the acid content of the oil, particularly if present in the form of strong acids, the alkaline reserve of the water employed, and similar factors. In practically all instances, the optimum pH of the effluent water will lie somewhere in the range 7 to 12, and frequently adequate processing can be obtained throughout this range, or at least a major portion thereof, although with certain oils, the pH must be maintained within substantially narrower limits, as indicated above. As indicated, the quantity of alkaline agent required for maintenance of the desired effluent pH will vary according to the character of the oil, but in testing a number of oils from a wide variety of sources, it has been found that, in general, the quantity best employed will be equivalent to from 1 to 100 lbs. of caustic soda per 1000 barrels of oil. In employing alkalies other than caustic soda, it is found that the quantity best employed will be usually not more than is equivalent on neutralizing basis to the indicated range for caustic soda and may be somewhat less.

As to the degree of heat which it is desirable to utilize, this will vary with different oils. In some instances, the resulting emulsion can be treated electrically at substantially room temperature but best results are obtained with most oils if the temperature of this resulting emulsion is between 90° F. and 210° F. Such temperatures can be obtained either by heating the oil or the water, or both, before mixing or may be obtained by heating the resulting artificial emulsion during stream flow thereof. If one or both of the constituents are heated, it is usually found that the desirable oil temperatures will range from 90° to 225° F., while the temperature of the water may be between 90° and 210° F. or higher, up to the boiling point of the water at the pressure existing thereon. In many instances, the water can be introduced into the heated oil at substantially room temperature.

As to the proportion of added water in the resulting artificial emulsion, this again will vary with different oils being treated. Proportions from about 8% up will give successful results, the upper limit being determined by the tendency to form inverse phase emulsions of the oil-in-water type in a quantity too large for the electric treater to handle, and by the tendency to short-circuit the electrodes of the treater. This upper limit cannot be set with any degree of certainty as it will vary with different oils. Usually about 50% is the upper limit. The percentage range for best results is between 15 and 30% on oils most commonly received for treatment and, with many oils, about 20% will be found to give especially favorable results.

It is important that the emulsifying step or steps should not produce an extremely tight emulsion. It is not the intent of the present invention to decrease the particle size of the originally-present droplets and consequently form new interfaces. Homogenization is to be avoided and if the emulsifying action is too intense, the resulting emulsion may be very difficult or impossible to treat electrically by continuous methods. The preferred resulting emulsion is of such character that a major portion of the added water will gravitationally separate, partially as emulsion and partially as free water if the artificial emulsion is allowed to stand quiescent and at elevated temperatures for two or three days.

If the invention is used in conjunction with that disclosed in the Eddy patent supra, the mixing action will desirably be such that a major portion of the original water droplets will coexist with the added and chemically modified water droplets. In that instance, the mixing action will be so controlled that no major portion of the original water droplets will coalesce with or dissolve in the added water droplets during the mixing step. The electric field is relied upon to coalesce these coexisting droplets and accomplish the other desirable results mentioned above.

In most instances, a single emulsifying action is satisfactory if properly controlled but, in other instances, it may be found desirable to emulsify the constituents in steps. The distributor 78 may be suitably designed so as to effect a further emulsification just before entry of the material into the field, though this is not essential. In its preferred embodiment, the present invention contemplates immediate treatment of the artificial emulsion and best results are obtained by continuously flowing this emulsion as fast as formed into the electric treater and, preferably, directly into the electric field thereof.

If the invention is used to remove impurities from oil containing not more than a few per cent of water, the particle size of the original water droplets may vary considerably. Usually, however, these droplets are quite small, often being of a size of about one micron or less. The most desirable mixing action will usually be found to form an artificial emulsion in which the water droplets are of an average size larger than the average size of the original water droplets. In many instances, it has also been found desirable to have the added water droplets of rather heterogeneous particle size.

Analyses of the treated oil withdrawn from the electric treater usually disclose the presence of a small percentage of water in the form of minute droplets. At the same time, tests for impurities will show that a major portion of the impurities has been removed, often more than 90% thereof. The water droplets will ordinarily be of a size approximating those present in the incoming oil, though they will be of a chemical composition different from the originally-present droplets. Generally speaking, the amount of water withdrawn as the water bleed of the treater will approximately correspond to the amount of water added in the process, and the water content of the treated oil will be approximately the same as that of the incoming oil though it is recognized within these definitions that, incidentally, the process may slightly decrease the water content in some instances, or it may slightly increase it in other instances, particularly where the incoming oil contains very little, if any, water. However, this treated oil is excellently suited for subsequent cracking or distillation and the water content thereof is not detrimental to the subsequent steps.

It is not always essential to add the water-soluble modifying agent directly to the water before incorporation into the oil. It is desirable, however, to so add the modifying agent that it will become associated with the water ahead of the mixing zone or, to some extent, in the mixing zone. For example, if ammonia in gaseous form is added to the pipe 101, some of this ammonia may neutralize acids, if present, in the incoming oil but sufficient ammonia will be used so that the excess will be present at the time water is introduced through the pipe 31. The mixing action at this point and the turbulence in the subsequent portion of the pipe 17 will incorporate the ammonia into the water even before reaching the emulsifying means 40. The process can thus be used to neutralize the oil before addition of the water and subsequent formation and treatment of the artificial emulsion, thus departing from any proposal to attempt to remove a part of the impurities and then add a neutralizing agent, such as ammonia, before subjecting the treated oil to distillation temperatures. In the present invention, the ammonia can be made to modify the effectiveness of the process and the electrically treated oil can be moved from the pipe 82 directly to the distilling equipment, if desired.

The addition of the alkaline agent to the oil prior to the introduction of the water and with or without supplementary pH modification of the water prior to its introduction into the oil frequently constitutes a very advantageous modification of our process, particularly in those instances where it is necessary to neutralize a substantial portion of the oil-soluble acids in order to obtain adequate treatment. To a certain extent, this modified process permits independent control of reactions primarily affecting the oil phase and reactions primarily affecting the interface, and, hence, is more flexible in character. When a relatively hard water is being employed for desalting, this modification also presents the advantage that it is not necessary to incorporate all the requisite alkali into the water prior to its dispersal in the oil, which incorporation would frequently result in the formation of alkaline earth precipitates in the water. The alkali may be added to the oil in various ways and in various forms, but it is usually highly advantageous to select for this modification an oil-soluble alkali, such as gaseous ammonia, or sodium phenolate. The alkali may also be added advantageously as a concentrated aqueous solution, e. g., concentrated caustic soda, which solution may be intimately dispersed throughout the oil. In many instances, and particularly when an aqueous solution is employed, it is desirable to provide a digestion period subsequent to the addition of the alkali of sufficient length to permit completion of the reaction between the alkali and constituents of the oil prior to dispersing water therein.

This application is a continuation-in-part of our copending application, Serial No. 167,396, filed October 5, 1937.

Various changes and modifications can be made without departing from the spirit of the invention as defined in the appended claims.

We claim as our invention:

1. A process for desalting a salty mineral oil of low water content, said oil containing dispersed saline particles and containing organic acids, which process includes the steps of: mixing a relatively fresh water and an alkaline agent with said oil, said mixing being of sufficient intensity to form an emulsion of the water in the oil and to disperse the water throughout the oil to provide droplets thereof coexisting with dispersed saline particles; substantially completely resolving said emulsion by subjecting the same to the action of a coalescing electric field of sufficient intensity to coalesce the dispersed material thereof; and separating the coalesced material from the oil, said alkaline agent being present in an amount which will substantially minimize the building up of sludge during separation of the coalesced material, said amount being sufficient to react with a part, but not all, of said organic acids.

2. The process as defined in claim 1 in which streams of said salty mineral oil and relatively fresh water are brought together and mixed and in which said alkaline agent is added to the material of one of said streams before said streams are brought together.

3. A process as defined in claim 1 in which said alkaline agent is added to said water prior to said mixing.

4. A process as defined in claim 1 in which said alkaline agent is added to said salty mineral oil prior to mixing.

5. A process for desalting a salty mineral oil of low water content, said oil containing dispersed saline particles and containing organic acids, which process includes the steps of: mixing a relatively fresh water and an alkaline agent with said oil, said mixing being of sufficient intensity to form an emulsion of the water in the oil and to disperse the water throughout the oil to provide droplets thereof coexisting with dispersed saline particles; substantially completely resolving said emulsion by subjecting the same to the action of a coalescing electric field of sufficient intensity to coalesce the dispersed material thereof; and separating the coalesced material from the oil, said alkaline agent being present in an amount which will substantially minimize the building up of sludge during separation of the coalesced material, said amount being sufficient to produce a pH in the separated coalesced material between about 7 and 12.

6. A process as defined in claim 5 in which the added alkaline agent comprises a salt of a strong base and a weak acid.

7. A process as defined in claim 5 in which the alkaline agent is added to the water prior to said mixing.

8. A process as defined in claim 5 in which the alkaline agent is added to the salty mineral oil prior to said mixing.

9. A process for desalting a salty mineral oil of low water content, said oil containing dispersed saline particles and containing reactable impurities, which process includes the steps of: mixing said salty mineral oil, a relatively fresh water and a water soluble chemical modifying agent reactable with said impurities and capable of changing the pH of the water to be coalesced and separated from the oil, said mixing being of sufficient intensity to form an emulsion of the water in the oil and to disperse the water throughout the oil to provide droplets thereof coexisting with dispersed saline particles; substantially completely resolving said emulsion by subjecting the same to the action of a coalescing electric field of sufficient intensity to coalesce the dispersed material thereof; and separating the coalesced material from the oil, said agent being present in an amount which will substantially minimize the building up of sludge during separation of the coalesced material, said amount being sufficient to produce a pH in the separated coalesced material between about 7 and 12.

10. A process as defined in claim 9 in which the chemical modifying agent comprises a salt of a strong base and a weak acid.

11. A process as defined in claim 9 in which streams of relatively fresh water and salty mineral oil are brought together and mixed and in which said chemical modifying agent is added to the material of one of said streams before said streams are brought together.

12. A process as defined in claim 9 in which the chemical modifying agent is added to the relatively fresh water prior to said mixing.

13. A process as defined in claim 9 in which the chemical modifying agent is added to the salty mineral oil prior to said mixing.

GORDON S. NEES.
RODERICK B. PERKINS, Jr.